United States Patent [19]
Odawara et al.

[11] Patent Number: 4,982,399
[45] Date of Patent: Jan. 1, 1991

[54] INFORMATION PROCESSING APPARATUS

[75] Inventors: Kazuharu Odawara; Yoshiaki Tago, both of Yokohama; Nobuo Inage, Tokyo, all of Japan

[73] Assignee: Kabushiki Kaisha Toshiba, Kawasaki, Japan

[21] Appl. No.: 355,781

[22] Filed: May 22, 1989

Related U.S. Application Data

[63] Continuation of Ser. No. 4,097, Jan. 16, 1987, abandoned.

[30] Foreign Application Priority Data

| Jan. 20, 1986 | [JP] | Japan | 61-9674 |
| Jan. 20, 1986 | [JP] | Japan | 61-9675 |
| Jan. 20, 1986 | [JP] | Japan | 61-9676 |
| Jan. 20, 1986 | [JP] | Japan | 61-9677 |
| Mar. 24, 1986 | [JP] | Japan | 61-65144 |

[51] Int. Cl.$^5$ .................. G11B 23/00; G11B 7/26
[52] U.S. Cl. .................. 369/270; 369/271; 369/290
[58] Field of Search .............. 369/270, 280, 281, 282, 369/289, 290; 360/133, 135

[56] References Cited

U.S. PATENT DOCUMENTS

| 2,806,704 | 9/1957 | Burdett | 369/290 |
| 3,706,085 | 12/1972 | Montey et al. | 369/270 |
| 3,801,476 | 4/1974 | Roschmann et al. | 369/282 |
| 4,489,410 | 12/1984 | Yamaguchi et al. | 369/270 |
| 4,587,647 | 5/1986 | Mak et al. | 369/270 |
| 4,608,681 | 8/1986 | Shiosaki | 369/77.2 |
| 4,616,278 | 10/1986 | Yamaguchi et al. | 369/282 |
| 4,658,311 | 4/1987 | Sakaguchi | 369/270 |
| 4,658,393 | 4/1987 | Ohta et al. | 369/290 |
| 4,694,370 | 9/1987 | Ommori et al. | 369/282 |
| 4,733,388 | 3/1988 | Fujimoto et al. | 369/270 |

FOREIGN PATENT DOCUMENTS

| 1104203 | 4/1961 | Fed. Rep. of Germany | 369/290 |
| 59-28895 | of 1984 | Japan | |

Primary Examiner—Stuart S. Levy
Assistant Examiner—Kenneth B. Wells
Attorney, Agent, or Firm—Cushman, Darby & Cushman

[57] ABSTRACT

An information processing apparatus includes an optical disk and a drive mechanism for rotating the disk. The disk comprises a disk-shaped body and an attractable portion at the central portion of the body. The attractable portion has an attractable member projecting from the body. A center hole, defining the center of rotation of the body, is cut in the attractable member. The drive mechanism includes a turntable which is rotated by a motor. A depression is formed in a support surface of the turntable. A magnetic attraction unit is arranged in the depression so as to magnetically attract the attractable portion, whereby the attractable member is housed in the depression and the surface of the body is in contact with the support surface.

14 Claims, 6 Drawing Sheets

INFORMATION PROCESSING APPARATUS

This is a continuation of application Ser. No. 07/004,097, filed Jan. 16, 1987, which was abandoned upon the filing hereof.

BACKGROUND OF THE INVENTION

The present invention relates to an information processing apparatus, and more specifically, to an information processing apparatus in which an information memory medium, such as an optical disk, is rotated so that information is recorded, reproduced, or erased by means of laser beams.

Recently, information processing apparatuses have started to be used frequently which employ an optical disk as a memory medium. As compared with those information processing apparatuses using conventional magnetic memory media, the apparatuses of this type have the following advantages. They have a larger information memory capacity, and can better perform extremely stable reproduction of information with less noise. Moreover, the improved apparatuses are less susceptible to external influences, thus enjoying very stable memory conditions. Also, they can perform information processing with the memory media not in contact with an information processing head, so that the media and head are less liable to be damaged.

As these information recording/reproducing apparatus have come into general use, the demand for thinner, lighter and less expensive apparatus have increased. However, the conventional apparatus cannot meet this demand for the following reason.

In order to hold the information memory medium or optical disk on a turntable, the disk is pressed against a turntable from the opposite side thereof, by means of a clamper. The clamper receives a clamping force from urging means, such as springs, or by magnetic attraction produced between the clamper and turntable. In the latter case, the clamper has a magnet, and the turntable is formed of magnetic material. The conventional apparatuses require a space for accommodating the clamper. Further, they need a drive mechanism for moving the clamper toward or away from the optical disk. As a result, the apparatus is bulky and complicated in construction, thus inevitably thick, heavy and expensive. Also, the use of the clamp mechanism makes it difficult to assemble the apparatus and to keep it in good condition.

If the clamp mechanism is of a spring type, the turntable is always subjected to an urging force. Therefore, the turntable, along with a rotating shaft integral therewith, must be made strong enough to resist the force. If the clamp mechanism is of a magnet type, the clamping force varies, depending on the thickness of the optical disk. When using relatively thick memory media, such as those including two bases stuck together, the clamping force may sometimes be reduced too much to hold the media securely.

SUMMARY OF THE INVENTION

The present invention has been contrived in consideration of these circumstances, and is intended to provide an information processing apparatus, which can perform stable information processing, and in which an information memory medium can be mounted securely on a turntable with ease, irrespective of the thickness of the medium, and without the use of any clamper that prevents reduction in thickness, weight, and costs of the apparatus.

In order to achieve the above object, an information processing apparatus according to the present invention comprises an information memory medium having a disk-shaped body and an attractable portion at the central portion of the body, the attractable portion including an attractable member projecting from the body and having a center hole defining the center of rotation of the body; and a drive mechanism for rotating the information memory medium, the mechanism including a turntable having a support surface for supporting the memory medium and a depression formed in the support surface, magnetic attraction means arranged in the depression for magnetically attracting the attractable portion, whereby the attractable member is housed in the depression and the surface of the body is in contact with the support surface, a positioning portion for engaging the center hole of the information memory medium so as to align the memory medium with the turntable, and a drive source for rotating the turntable.

BRIEF DESCRIPTION OF THE DRAWINGS

FIGS. 1 to 7 show an information processing apparatus according to a first embodiment of the present invention, in which FIG. 1 is a side view, partially in section, of the apparatus with an information memory medium off its drive mechanism, FIG. 2 is a side view, partially in section, of the apparatus with the information memory medium on the drive mechanism, FIG. 3 is an enlarged sectional view showing an essential part of the information memory medium, FIG. 4 is a sectional view of a die, for illustrating a process of forming a base plate of the information memory medium, FIG. 5 is an enlarged sectional view showing a bore portion of the base plate, FIG. 6 is an enlarged plan view showing an attractable portion of the information memory medium, and FIG. 7 is an exploded perspective view of the attractable portion;

DETAILED DESCRIPTION OF THE PREFERRED EMBODIMENTS

Preferred embodiments of the present invention will now be described in detail with reference to the accompanying drawings.

Figure 1:
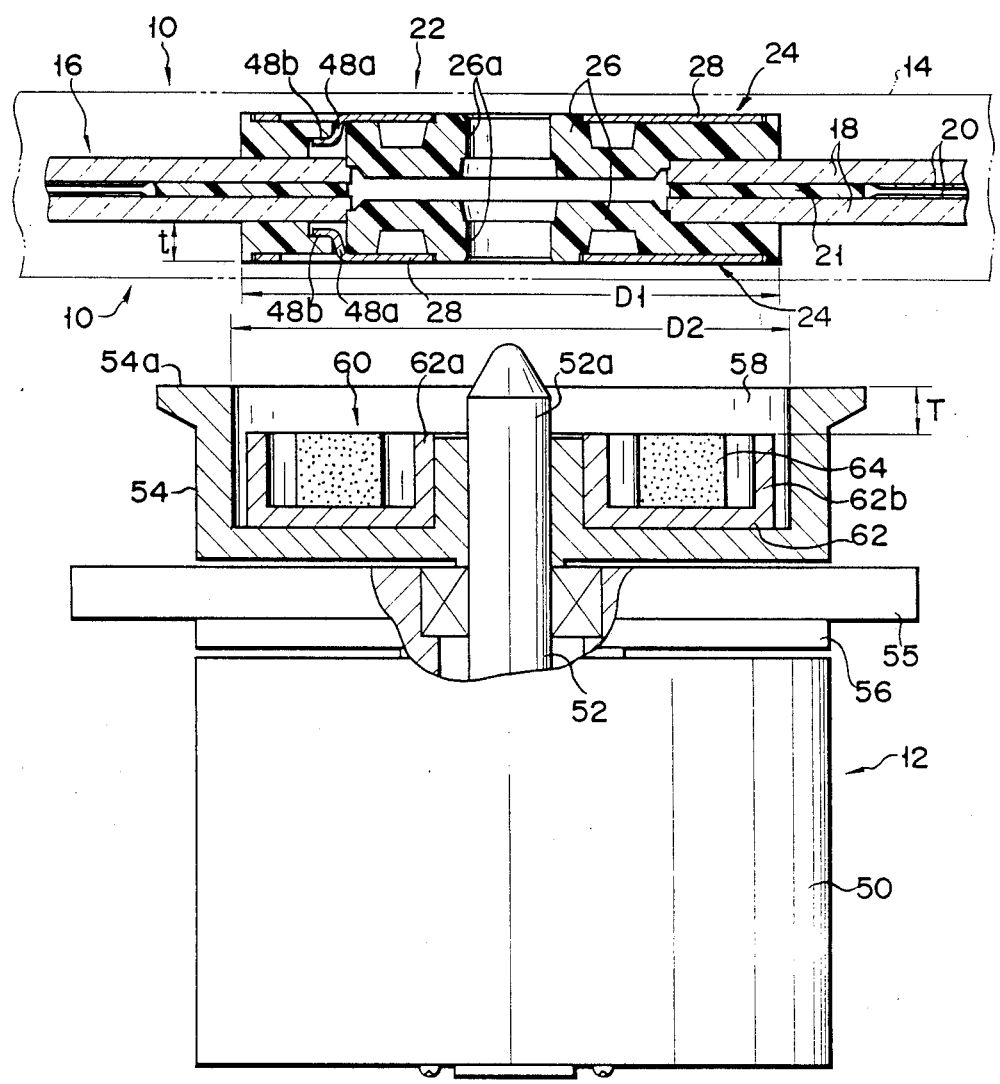

As shown in FIG. 1, an information processing apparatus comprises optical disk 10 as an information memory medium, and drive mechanism 12 arranged in a processing apparatus housing (not shown) and used to rotate the disk. Disk 10, along with cartridge 14 (indicated by two-dot and dash line) in which it is contained, is adapted to be inserted into the apparatus housing through a medium slot in the housing. Thereupon, disk 10 is automatically introduced horizontally into a predetermined position by a medium guiding/loading mechanism. During this process, part of cartridge 14 is open so that the center portion of disk 10 is exposed. Thereafter, cartridge 14 moves along the plane of disk 10, so that the disk is mounted automatically on drive mechanism 12.

Body 16 of optical disk 10 includes two disk-shaped base plates 18 each having bore 19. Information recording layer 20 is formed on one side of each base plate 18. Base plates 18 are bonded concentrically to each other, with inside ring-shaped spacer 21 and an outside ring-shaped spacer (not shown) between them. The base plates are formed from glass or optically transparent plastic material, such as acrylic resin, polycarbonate, etc., by injection molding. Inside and outside spacers are bonded to plates 18 bY means of ultraviolet-curing resin.

Figure 2:
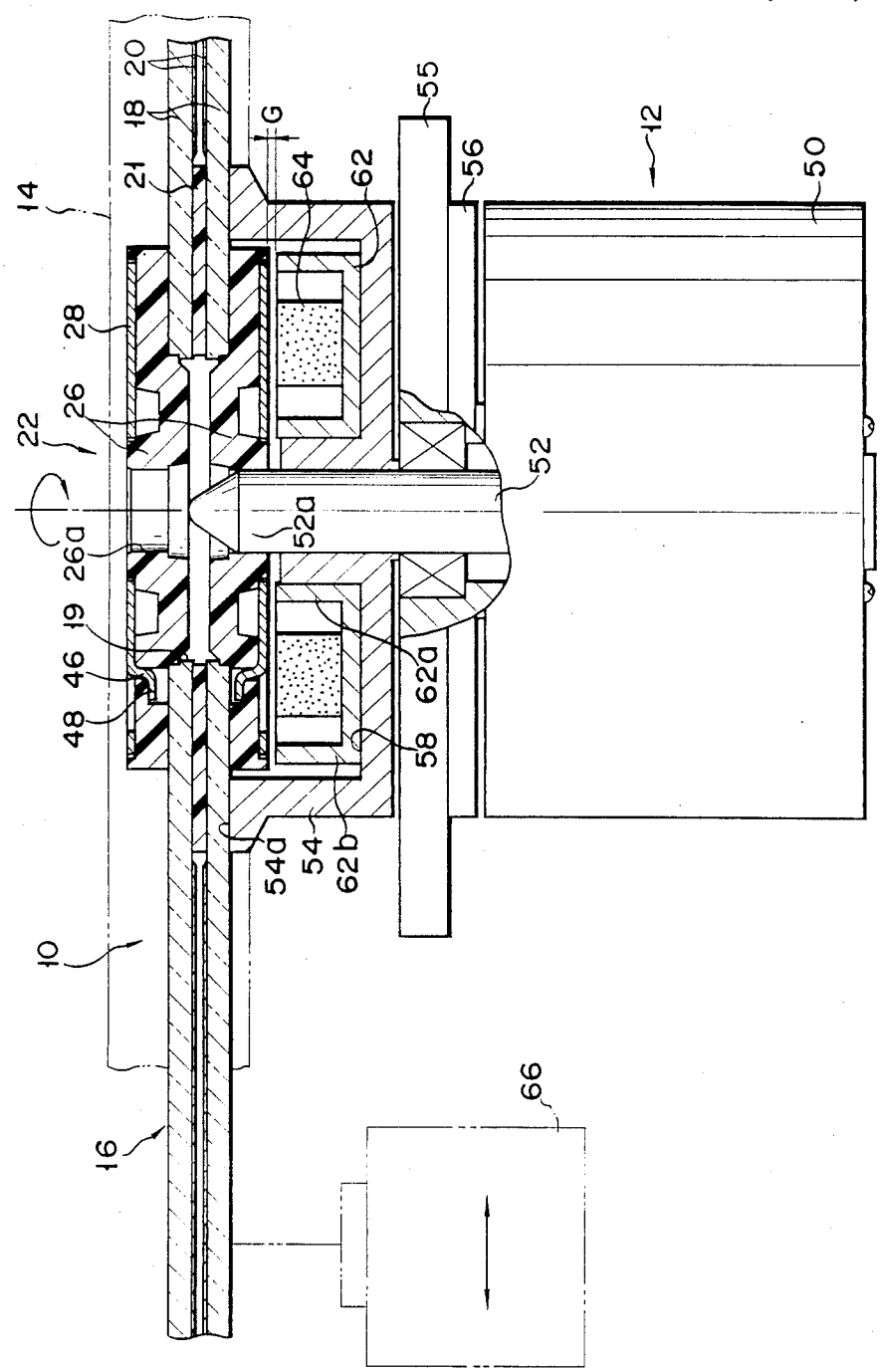
Figure 3:
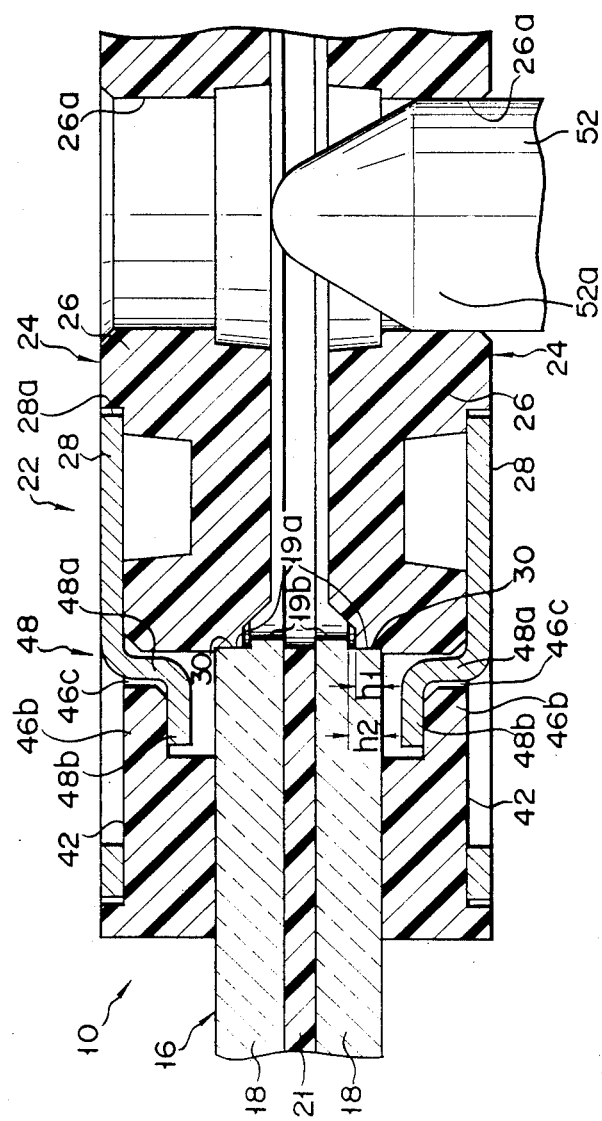

As shown in FIGS. 1, 2 and 3, optical disk 10 is provided with attractable portion 22 at the central portion of body 16. Portion 22 includes a pair of attractable members 24 fixed to the central portions of their corresponding base plates 18. Members 24 each include centering member 26 and magnetic member 28 attached thereto.

Centering member 26 is a discoid of thickness t, which is formed of synthetic resin and has center hole 26a. Further, member 26 has ring-shaped projection 30 coaxial with hole 26a. While projection 30 is fitted in bore 19 of its corresponding base plate 18, it is fixedly bonded to the outer surface of the base plate, or the opposite surface thereof to that surface on which information record layer 20 is formed. Thus, centering member 26 is coaxially positioned relatively to base plate 18. Also, member 26 is bonded to base plate 18 by means of a bonding agent having no bad influences on the base plate, such as epoxy resin.

Figure 4:
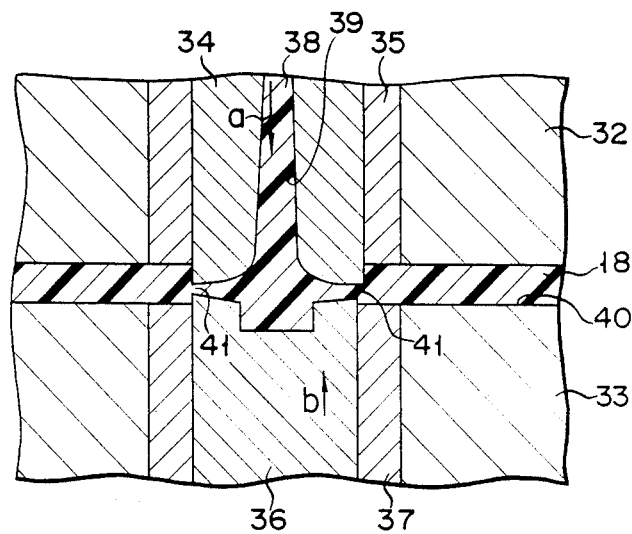
Figure 5:
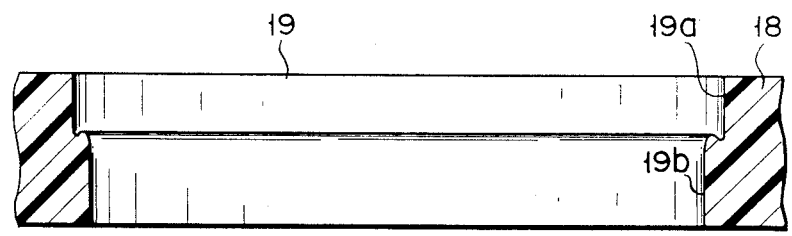

In order to shorten the working time to make base plates 18, bore 19 of each plate 18 is formed during the process of injection molding. As shown in FIG. 4, the die assembly for forming plates 18 includes fixed die 32, movable die 33, spool bush 34 guided by bush guide 35, and punch 36 guided by punch guide 37. In the state shown in FIG. 4, molten plastic material 38 is injected into cavity 40, defined between fixed and movable dies 32 and 33, through spool 39 of spool bush 34 and gates 41, as indicated by arrow a. Thereafter, punch 36 is moved in the direction of arrow b to cut the resin at gate 41. Thus, base plate 18 with bore 19 is completed.

Bore 19, formed in this manner, is stepped, including large- and small-diameter portions 19a and 19b. Portion 19a is defined by the end portion of spool bush 34, and portion 19b is formed by ripping off the resin at the gate portion by means of punch 36. Moreover, the diameter of portion 19a is high in accuracy, while the inner peripheral surface of portion 19b is not smooth, and its diameter is low in accuracy. Information record layer 20 is formed on that surface of each base plate 18 on the side of small-diameter portion 19b.

As described above, large-diameter portion 19a of bore 19 is formed with higher dimensional accuracy than small-diameter portion 19b. Therefore, height h1 of projection 30 of each centering member 26 is shorter than axial length h2 of portion 19a so that projection 30 can engage only portion 19a of higher accuracy. Thus, members 26 are fixed with high positional accuracy, without being substantially eccentric to base plates 18.

Bore 19 of each base plate 18 is worked with high accuracy, so as to be coaxial with a spiral pre-groove (not shown) for recording and reproduction, formed on the base plate. Likewise, the outer peripheral surface of projection 30 and center hole 26a of each centering member 26 are worked with high accuracy, so as to be coaxial with each other. Thus, when member 26 is fixed to base plate 18, the center of the pre-groove is accurately in alignment with that of hole 26a or the center of rotation of base plate 18. It is therefore possible to prevent lowering of recording/reproducing accuracy or increase of access time, which will be caused if the pregroove is eccentric to the rotational center of base plate 18.

An ideal situation would exist if disk base plates 18 and centering members 26 were formed of the same material. The reason is that if base plates 18 and members 26 are more or less different in coefficient of thermal expansion, bonded or fitted regions between the base plates and centering members will be distorted in case of a temperature change.

Figure 6:
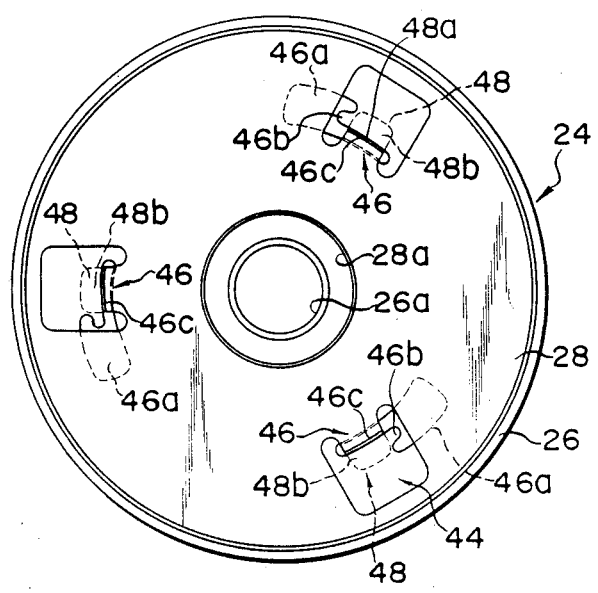
Figure 7:
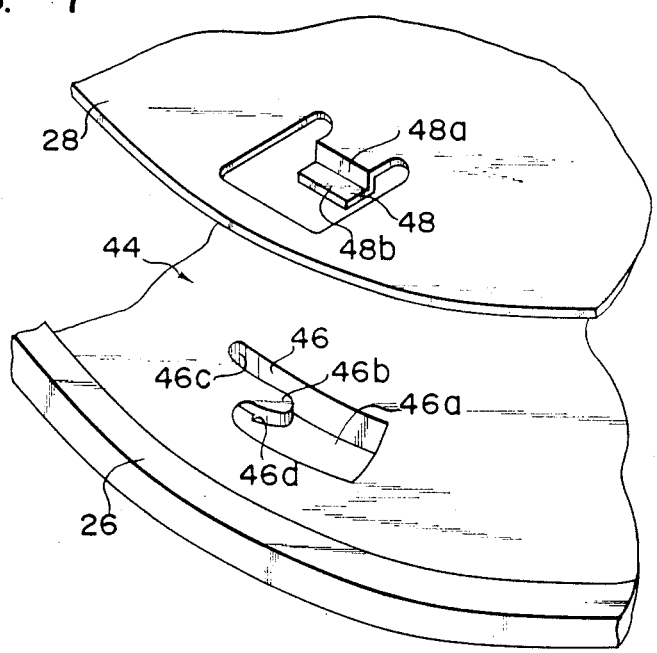

As shown in FIGS. 3, 6 and 7, magnetic member 28 of each attractable member 24 is formed from a metal plate into a disk-shaped member, having aperture 28a in the center. Member 28 is located in annular depression 42 which is formed in the outer surface of each corresponding centering member 26. Depression 42 is a little larger than member 28. Further, member 28 is attached to member 26 by mounting mechanism 44, so that the magnetic member is not movable in the direction perpendicular to the surface of base plate 18 but, is slightly movable in the direction parallel to the base plate surface.

Mounting mechanism 44 includes three retaining portions 46 formed on centering member 26. Portions 46 are arranged at regular intervals along the circumference of a circle concentric with the centering member. Also, mechanism 44 includes three retaining claws 48 formed on magnetic member 28. Claws 48 are arranged corresponding in position to portions 46, so that they can engage with portions 46.

Each retaining claw 48 is formed into an L-shaped piece by cutting and raising part of magnetic member 28 toward centering member 26. Claw 48 includes vertical portion 48a extending vertically from member 28 and horizontal portion 48b extending parallel to member 28, from the extended end of portion 48a. Each retaining portion 46 includes aperture 46a, large enough to allow insertion of its corresponding claw 48 therein, and engaging projection 46b projecting into aperture 46a. Projection 46b defines slit 46c which is continuous with aperture 46a. Detent projection 46d is formed on the lower surface of projection 46b.

In mounting magnetic member 28 on centering member 26, retaining claws 48 are first passed through their corresponding apertures 46a of member 26. Then, member 28 is rotated in the clockwise direction of FIG. 6, so that vertical portions 48a of claws 48 are inserted into slits 46c of their corresponding retaining portions 46. As a result, horizontal portions 48b of claws 48 engage the lower surfaces of projections 46b. In doing this, portions 48b are deformed elastically, and then get over detent projections 46d on the lower surfaces of projections 46b. Thus, if claws 48 are urged to move back toward apertures 46a, they cannot do so, as they are hindered by projections 46d.

Mounted on centering member 26 in this manner, magnetic member 28 is restrained from moving in a direction perpendicular to the surface of base plate 18, as horizontal portions 48b of retaining claws 48 engage projections 46b of their corresponding retaining portions 46. In a direction parallel to the surface of base plate 18, on the other hand, the magnetic member is allowed to move for the width of a gap formed between vertical portions 48a of claws 48 and their corresponding slits 46c.

As shown in FIGS. 1 and 2, moreover, drive mechanism 12 for driving optical disk 10, constructed in this manner, includes brushless DC motor 50 of an outer-rotor type, for use as a drive source, and turntable 54 mounted on rotating shaft 52 of motor 50 and adapted to rotate, integrally with shaft 52. Tip end portion 52a of shaft 52 is inserted into center hole 26a of disk 10, as mentioned later, thus constituting a positioning portion for positioning the disk relatively to turntable 54. Motor 50 is supported by frame 55, which is fitted with control board 56 for controlling the operation of the motor.

Turntable 54, which is formed of nonmagnetic metal, has support surface 54a perpendicular to shaft 52 of motor 50. Also, turntable 54 is formed with circular depression 58, which is coaxial with shaft 52, and opens to surface 54a. Diameter D2 of depression 58 is greater than diameter D1 of centering members 26 of optical disk 10. Depression 58 contains magnetic attraction means 60 which magnetically attracts attractable portion 22 of disk 10. Attraction means 60 includes ring-shaped yoke 62 and magnet 64, which are arranged coaxially with shaft 52. Yoke 62 has inner and outer peripheral walls 62a and 62b, coaxial with each other, and magnet 64 is located between the peripheral walls. The top faces of yoke 62 and magnet 64 are located at distance T from support surface 54a of turntable 54. Distance T is greater than height t of projection of centering members 26 of optical disk 10. Thus, housed in depression 58, magnetic attraction means 60 can fully exhibit its force of attraction for mounting disk 10 on turntable 54, and prevent magnetic leakage to the outside.

As described above, diameter D1 and height t of centering member 26 are smaller than diameter D2 of depression 58 and distance T, respectively. Therefore, if optical disk 10 is set on turntable 54 so that positioning portion 52a of shaft 52 is inserted in one of center holes 26a of attractable portion 22, as shown in FIG. 2, one of attractable members 24 is housed fully in depression 58. As a result, magnetic member 28 of the attractable member is attracted by magnet 64, so that disk 10 is mounted in direct contact with support surface 54a of turntable 54.

Thus, base plate 18, with information recording layer 20 thereon, is held securely against turntable 54, so that vibration of base plate 18 perpendicular to its surface can be minimized. Accordingly, information can be recorded or reproduced stably. In the case of an arrangement such that attractable member 24, instead of base plate 18, is adapted to be in contact with support surface 54a of turntable 54, optical disk 10 will vibrate considerably, unless the surfaces of member 24 and base plate 18 are worked so as to be very accurately parallel to each other. Therefore, member 24 and the bonding agent must be made uniform in thickness. This requires a very difficult processing of the piece.

The length of positioning portion 52a of shaft 52 is set so that portion 52a can engage only center hole 26a of the turntable-side attractable member when optical disk 10 is mounted on turntable 54. There will be no substantial problem ever if center holes 26a of attractable members 26 are not aligned with high accuracy.

If positioning portion 52a engages center holes 26 of both attractable members 24, the two center holes must be very accurately coaxial with each other. However, it is very difficult to align bores 19 of base plates 18 or center holes 26a of members 24. Moreover, if positioning portion 52a is unnecessarily long, it takes optical disk 10 a long time to be set on turntable 54. This causes excessive wear on the disk.

Thus, magnetic attraction means 60 is housed in depression 58 formed in turntable 54, so that magnetic leakage to the outside is restricted to a low level. Accordingly, iron filings or powder of other magnetic material can be prevented from hindering the engagement of shaft 52 and center hole 26a by sticking to shaft 52.

As mentioned before, height t of projection of each centering member 26 is shorter than distance T between the top faces of yoke 62 and magnet 64 and support surface 54a of turntable 54. When optical disk 10 is mounted on turntable 54, therefore, gap G is defined between attractable member 24 and magnetic attraction means 60. Gap G has a size such that the disk can be subjected to a force of attraction which allows the driving force of turntable 54 to be transmitted securely to disk 10, and which allows the disk to be removed easily from turntable 54, by only lifting cartridge 14 with the disk therein. In this embodiment, gap G has a size such that a force of attraction of about 700 g acts on attractable member 24.

In FIG. 2, numeral 66 designates a head, which is moved in the radial direction of optical disk 10 by head moving means, such as a linear motor. Head 66 performs information processing, such as recording or reproduction, on information record layer 20 formed on lower-side base plate 18 of disk 10.

According to the information processing apparatus constructed in this manner, optical disk 10, including disk base plates 18 and attractable portion 22 in the center of plates 18, is mounted on turntable 54 by magnetic attraction means 60 attached to the turntable. Thus, disk 10 can be mounted stably on turntable 54, irrespectively of the thickness of the disk, and without requiring any clamp mechanism, which has conventionally been used, preventing reduction in thickness, weight, and costs of the apparatus. Moreover, each attractable member 24 is provided with centering member 26 and magnetic member 28, which is attached to member 26 by mounting means 44, so as to be slightly movable in the direction parallel to the surface of disk base 18. Therefore, even if disk 10 is subjected to any thermal effect, such as a change of ambient temperature, the mobility of magnetic member 28 can absorb the difference in the degree of thermal expansion between member 28 and the combination of base plate 18 and centering member 26, attributable to their different coefficients of thermal expansion. Thus, information can be processed stably without causing any distortion in base plates 18.

In the embodiment described above, the material of centering members 26 is not limited to synthetic resin. The centering members must only be formed of a material whose coefficient of thermal expansion resembles that of base plates 18. Thus, the material of the centering members depends on that of the base plates. If the base plates are made of glass, for example, the centering members may be formed of glass or ceramic material.

Figure 8:
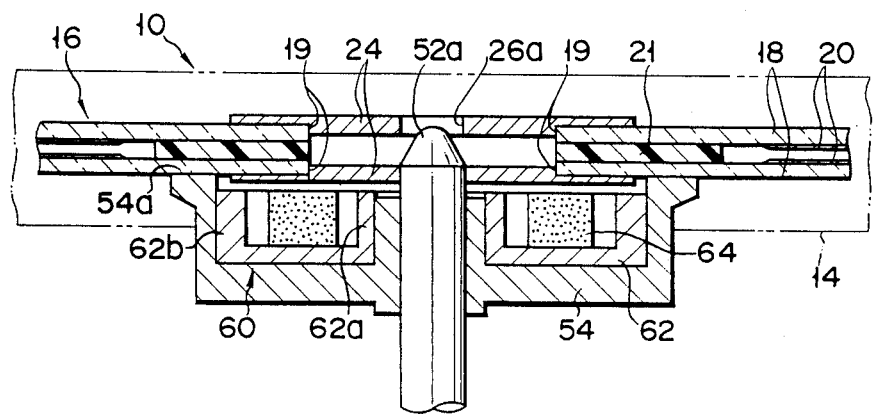
FIG. 8 is a side view, partially in section, of an information processing apparatus according to a second embodiment of the invention.

FIG. 8 shows a second embodiment of the present invention. In this embodiment, the centering member and magnetic member of each attractable member 24 are formed integrally by cutting a magnetic material, such as metal. Other portions or members than attractable members 24, according to this embodiment, are arranged in the same manner as those of the first embodiment. In FIG. 8, therefore, like reference numerals are used to designate like portions as in the first embodiment.

Also in the second embodiment arranged in this manner, the conventional clamp mechanism need not be used, thus permitting reduction in thickness, weight, and costs of the apparatus, and the optical disk can be mounted stably on the turntable, irrespectively of the thickness of the disk.

It is to be understood that the present invention is not limited to the embodiment described above, and that various changes and modifications may be effected therein by one skilled in the art without departing from the scope or spirit of the invention.

In the embodiments described above, an optical disk with two disk base plates is used as the information memory medium. Alternatively, however, the disk may be provided with only one plate. Further, magnetic attraction means 60 may be formed only of a magnet. The shape of depression 58 in turntable 54 is not limited to the circular configuration, and may alternatively be a hexagonal or rectangular one. Each attractable member 24 must only have shape and size such that it can be housed in the depression.

Figure 9:
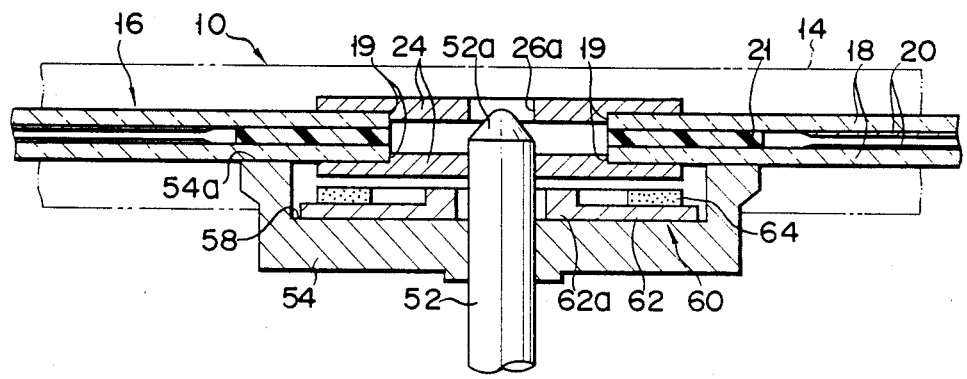
FIGS. 9 and 10 are side views, partially in section, of information processing apparatuses according to different modifications of the invention.

In the aforementioned embodiments, moreover, the yoke of the magnetic attraction means has inner and outer peripheral walls. Alternatively, however, it may be provided only with an inner peripheral wall, as shown in FIG. 9, or an outer peripheral wall, as shown in FIG. 10.

Figure 10:
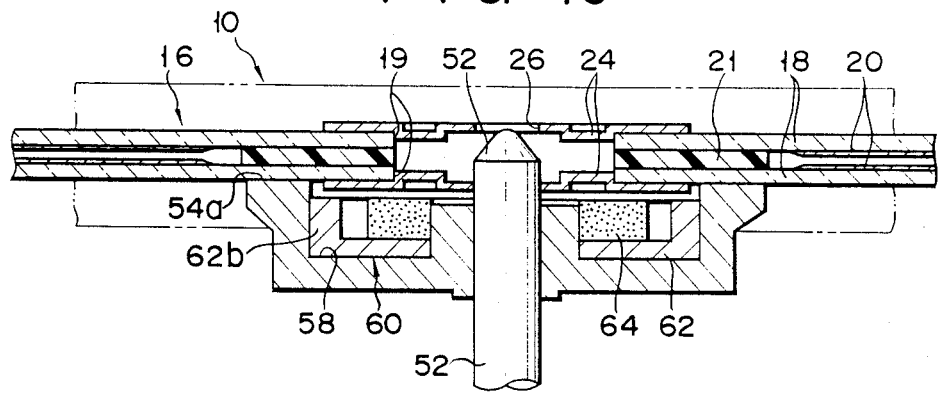

In the second embodiment, furthermore, attractable members 24 may be formed by pressing, as shown in FIG. 10, instead of cutting.

What is claimed is:

1. An information memory medium for use with means for rotatably supporting the medium, means for magnetically attracting the medium toward the supporting means, and rotatable housing means for housing the magnetic attracting means, said information memory medium comprising:
   a plane body having a recording portion for storing data; and
   an attractable member projecting from said plane body so as to be attracted by the magnetic attraction means, said attractable member being sized and adapted to be housed in the housing means and a gap is formed between the attractable member and the magnetic attraction means, said attractable member including a centering member fixed to the plane body and having means for centering the plane body with respect to the supporting means, and a magnetic member mounted on the centering member, a thermal expansion characteristic of the centering member being substantially the same as a thermal expansion characteristic of said plane body and said magnetic member being adapted to be attracted by the magnetic attraction means, wherein said attractable member includes means for coupling said magnetic member to said centering member in a way that relative movement in a direction parallel to a plane of said members is possible, but relative movement in a perpendicular direction to said plane of said members is not possible, wherein both said centering and magnetic members are formed with apertures, and said coupling means comprises:
   a retaining claw on one of said members, said retaining claw extending toward the other of said members and disposed in said aperture of said other member, said retaining claw defining a first surface which has a component in said parallel direction and a stop surface which faces a direction other than said parallel direction; and
   a retaining portion on said other member, in said aperture of said other member, and defining a second surface facing opposite said first surface, for mating with said first surface and thereby preventing movement in said perpendicular direction, and a third surface for preventing said stop surface from moving beyond said third surface, thereby maintaining the mating between said retaining claw and said retaining portion.

2. A medium as in claim 1, wherein a width of said first surface is less than a corresponding width of said aperture in said other member, permitting a relative movement in said parallel direction between said centering member and said magnetic member, bounded by said third surface and an edge of said aperture.

3. An information memory medium for use with a magnetic attraction means for magnetically attracting said information memory medium, means for rotatably supporting said information memory medium which is magnetically attracted by the attracting means and rotatable housing means for housing the magnetic attracting means, said information memory medium comprising:
   a plane body having a recording portion for storing data; and
   an attractable member projecting from said plane body so as to be attracted by the magnetic attraction means, said attractable member being sized and adapted to be housed in the housing means so that said plane body directly contacts the supporting means and a gap is formed between the attractable member and the magnetic attraction means when said attractable member is attracted to said attraction means, and said attractable member includes a centering member, and a magnetic member, and means for coupling said magnetic member to said centering member in a way that relative movement in a direction parallel to a plane of said members is possible, but relative movement in a perpendicular direction is not possible, wherein both said members are formed with apertures, and said coupling means comprises:
   a retaining claw on one of said members, said retaining claw extending toward the other of said members and disposed in said aperture of said other member, defining a first surface which has a component in said parallel direction and a stop surface which faces a direction other than said parallel direction; and
   a retaining portion on said other member, in said aperture of said other member, and defining a second surface facing opposite said first surface, for mating with said first surface and thereby preventing movement in said perpendicular direction, and a third surface for preventing said stop surface from moving beyond said third surface, thereby maintaining the mating between said retaining claw and said retaining portion.

4. An apparatus for rotatably supporting an information memory medium having a disk-shaped body for storing information and an attractable member projecting from the disk-shaped body, said attractable member including a centering member fixed to the disk-shaped body and having means for defining a center of rotation of the disk-shaped body, and a magnetic member mounted on the centering member to be movable by a small amount in a direction parallel to a surface of the disk-shaped body and immovable in a direction perpendicular to the surface of the disk-shaped body, a thermal expansion characteristic of the centering member being substantially the same as a thermal expansion characteristic of the disk-shaped body, said apparatus comprising:

means for magnetically attracting the attractable member of the information memory medium;

means for rotatably supporting the information memory medium when said attractable member is magnetically attracted by said attracting means, said supporting means having a rotatable support surface and rotatable housing means for partially housing said attractable member so that the memory medium is supported while the disk-shaped body is in contact with the support surface, and said attracting means being arranged in the housing means so as to create a gap between the magnetically attracting means and the attractable member partially housed in the rotatable housing means; and means for engaging said center defining means of the medium to center the disk-shaped body with respect to the supporting means.

5. An apparatus according to claim 4, wherein said rotatable support surface includes a depression formed therein to support said magnetically attracting means in said housing means at a level lower than a level of the support surface.

6. An apparatus according to claim 5, wherein said depression is formed so that a second gap is maintained between an inner surface of the depression and the attractable member housed in the depression.

7. An apparatus according to claim 5, wherein said attracting means includes a top surface which is located below the support surface to face the attractable member housed in the depression while said gap is maintained between the top surface and the attractable member.

8. An apparatus according to claim 7, wherein said supporting means includes a turntable with said support surface and said depression.

9. An apparatus according to claim 8 wherein said turntable includes a rotational axis and means for aligning the memory medium with the rotational axis of the turntable.

10. An apparatus according to claim 9, which further comprises means for rotating the turntable, the rotating means having a rotating shaft to which the turntable is coaxially fixed and which has a tip end portion projecting into the depression to engage the attractable member, thereby constituting said aligning means.

11. An apparatus according to claim 8, wherein said turntable is formed of a non-magnetic material.

12. An apparatus according to claim 8, wherein said attracting means includes an annular magnet and an annular yoke which are arranged in the depression to be coaxial with the rotational axis of the turntable.

13. An information memory medium for use with means for rotatably supporting the medium, means for magnetically attracting the medium toward the supporting means, and rotatable housing means for housing the magnetic attracting means, said information memory medium comprising:

a plane body having a recording portion for storing data; and an attractable member projecting from said plane body so as to be attracted by the magnetic attraction means, said attractable member being sized and adapted to be housed in the housing means and a gap is formed between the attractable member and the magnetic attraction means, said attractable member including a centering member fixed to the plane body and having means for centering the plane body with respect to the supporting means, and a magnetic member mounted on the centering member to be movable by a small amount in a direction parallel to a surface of the disk-shaped body and immovable in a direction perpendicular to the surface of the disk-shaped body, a thermal expansion characteristic of the centering member being substantially the same as a thermal expansion characteristic of said plane body and said magnetic member being adapted to be attracted by the magnetic attraction means.

14. An apparatus for rotatably supporting an information memory medium having a pair of disk-shaped bodies fixed coaxially to each other, information recording layers individually formed on the disk-shaped bodies, and a pair of attractable members projecting from the corresponding disk-shaped body, each attractable member including a centering member fixed to the corresponding disk-shaped body and having a center hole for defining a center of rotation of the disk-shaped body, and a magnetic member mounted on the centering member, a thermal expansion characteristic of the centering member being substantially the same as a thermal expansion characteristic of the disk-shaped body, said apparatus comprising:

means for magnetically attracting the attractable member of the information memory medium;

means for rotatably supporting the information memory medium when said attractable member is magnetically attracted by said attracting means, said supporting means having a rotatable support surface and rotatable housing means for partially housing part of one of said attractable members so that the memory medium is supported while one of the disk-shaped bodies is in contact with the support surface; and means for aligning the memory medium with respect to the supporting means, said aligning means having an engaging member which engages only the center hole of that centering member which is fixed to the disk-shaped body contacting the support surface when the memory medium is mounted on the supporting means.

* * * * *